Feb. 24, 1925.
B. P. CURRIER
1,527,350
TRIAL FRAME
Filed April 10, 1922
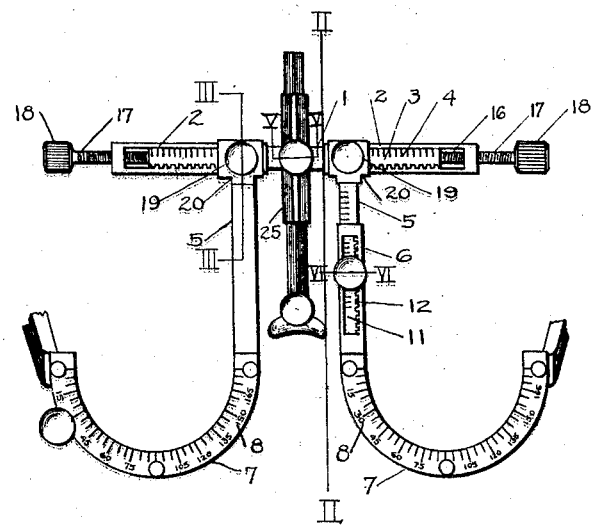
FIG. I
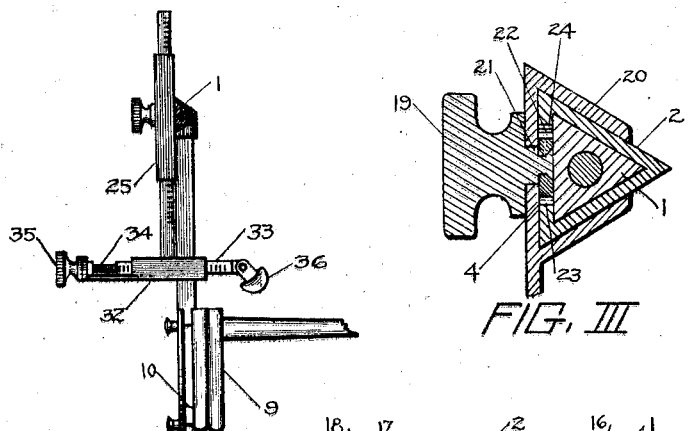
FIG. II
FIG. III
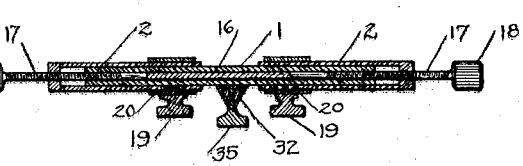
FIG. IV
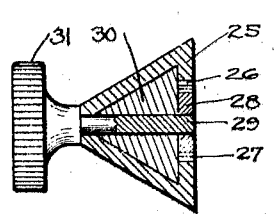
FIG. V
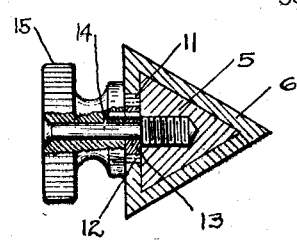
FIG. VI
INVENTOR
BERNARD P. CURRIER.
BY
ATTORNEYS Patented Feb. 24, 1925.

1,527,350

UNITED STATES PATENT OFFICE.

BERNARD P. CURRIER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

TRIAL FRAME.

Application filed April 10, 1922. Serial No. 551,135.

*To all whom it may concern:*

Be it known that I, BERNARD P. CURRIER, a citizen of the United States, residing at Southbridge, in the county of Worcester and State of Massachusetts, have invented certain new and useful Improvements in Trial Frames, of which the following is a specification.

This invention relates to new and useful improvements in trial frames and more particularly to that type of frame wherein the lens receiving cells can be readily manipulated for moving them either individually or simultaneously.

The main object of the present invention is the provision of a trial frame wherein the construction embodies the use of triangular shaped parts preferably tubular in cross section to provide for increased strength and durability in a trial frame and wherein the movable parts of the frame are so fitted together that they will readily move one within the other to provide for the quicker and easier adjustment of the several parts.

Another object of the invention is the provision of a trial frame of the above type wherein the lens receiving cells are fitted inwardly from the usual position of lens receiving cell to bring the testing lens closer to the eye so that when the frame is properly fitted upon the patient's face, the testing lens will assume the same relative position that is required in the lenses which are to be fitted to the patient's eyes so that the proper vision of the patient's eyes can be obtained to be included in the prescription.

Another object of the invention is the provision of means used in connection with the lens receiving cells whereby the lens cells may be readily adjusted so as to bring the testing lenses in alignment with the horizontal center of the patient's eyes, as it oftens occurs that the central vision of a patient's eyes will be somewhat out of alignment and in order to obtain the correct alignment of both eyes I have provided for this adjustment.

A further object of the invention is the provision of a trial frame formed of triangular parts and having suitable adjusting means in connection with said parts whereby all of the various parts of the frame can be quickly and readily adjusted so that the frame may be properly fitted to the patient's face.

With the above and other objects in view the invention consists in the novel features of construction, the combination and arrangement of parts hereinafter more fully set forth, pointed out in the claims and shown in the accompanying drawings, in which—

Figure I represents a front view of a trial frame embodying my improvements.

Figure II represents a sectional view as on the line II—II of Figure I.

Figure III represents a fragmentary sectional view as on the line III—III of Figure I.

Figure IV represents a longitudinal sectional view thru the supporting bar and parts carried thereby.

Figure V represents a sectional view on the line V—V of Figure I, and

Figure VI represents a sectional view on the line VI—VI of Figure I.

In carrying out my invention I beg to call attention to the fact that the various parts of the frame are constructed of triangular shaped tubular material, this shape not only providing for a substantially rigid frame thruout but permits the various movable parts to be moved one within the other which will provide for a quicker and readier adjustment of the several parts.

In the accompanying drawings, 1 indicates a longitudinally supporting bar which is triangular in cross section as illustrated in Figure III said bar having mounted for sliding movement upon each end thereof the sleeves 2, said sleeves being cut away as at 3 leaving a space whereby to view the graduations 4 formed upon the upper face of the longitudinal bar 1 supported from the sleeves 20 and arranged upon opposite sides of the transverse center of the bar 1 are the supporting arms 5 and 5'. A sleeve 6 is mounted upon the arm 5 for sliding movement. The sleeve 6 and the arm 5' are both provided with the arcuate end portions 7 having the graduations 8 marked thereon.

The lens cells 9 are preferably supported at the rear of the arcuate portions 7 and spaced therefrom by means of the spacing members 10 whereby to support the lens cells rearwardly of the arcuate members 9 and in such position as to permit the lens cells to assume a sliding position when the trial frame is fitted to the patient's face, thus supporting the testing lenses in the proper position with respect to the patient's eyes.

The sleeve 6 is provided with a longitudinal slot 11 having a rack 12 upon one side thereof adapted to be engaged by means of a pinion 13, said pinion being carried by the upright shaft 14, the lower end of which is mounted for turning movement within one of the arms 5, a finger piece 15 supported at the upper end of the shaft adapted to be engaged by the fingers for rotating the pinion 13 to adjust one of the lens cells toward and away from the eye, in order to obtain a correct alignment of the patient's eyes. It will be apparent that the adjustment of one of the lens cells will be sufficient to provide for aligning the eyes of the patient.

In order to provide for adjustment of the sleeves 2 a rod 16 is extended thru the body member 1 and journaled within each end of the joint whereby the rod may be readily rotated, each end of the rod being provided with a screw thread 17, one end having a right hand screw thread and the other end provided with a left hand screw thread. The rod 16 is threaded thru the ends of the sleeves 2, the threads in the sleeves corresponding to the type of threads on the rod whereby turning movement of the rod will simultaneously move the sleeves either toward or away from each other. In order to provide for manipulation of the rod suitable thumb pieces 18 are attached to each end thereof whereby these pieces may be readily grasped for rotating the rod.

In order to provide for the individual adjustment of the arms 5 a thumb piece 19 is mounted upon the upper face of each of the sleeves 20, said thumb piece having a projecting shank portion 21 upon the inner end of which is mounted a pinion 22, said pinion engaging a rack 23 formed upon one side of a longitudinal slot 24, said slot being formed within the sleeve 2. From this it will be apparent that upon rotating the finger piece 19 the sleeve 20 will be moved along over the sleeve 2.

It will be noted that the sleeves 20 embrace the sleeves 2 for readily sliding thereon, the sleeves 2 being held against movement, turning the movement of the sleeves 20 by means of the screw threads 17. From this it will be apparent that the lens cells may be moved toward and away from each other either individually or simultaneously.

My improved nose bridge comprises a supporting sleeve 25 mounted upon the bar 1 and having in its base a slot 26 provided with a rack 27 upon one side thereof adapted to be engaged by a pinion 28 mounted upon the lower end of a shaft 29. This shaft 29 is carried by the movable bar 30 and is provided upon its upper end with a finger piece 31 whereby to readily manipulate the pinion 28 for moving the bar 30 within the sleeve 25 so as to provide for adjustment of the nose bridge supporting member.

Attached to the outer end of the bar 30 is a sleeve 32 and movable within this sleeve is a bar 33, the bars 30 and 33 being provided with suitable graduations to indicate the various adjustments. Supported within the cross end of the sleeve 32 is a threaded rod 34 movable within a threaded bore formed in one end of the bar 33, the rod 34 being provided upon its outer end with a thumb piece 35 to provide for the manipulation of the rod 34 to move the bar 33 in and out of the sleeve 32, thus adjusting the nose bridge 36 to accommodate the same to the face of the patient.

From the above description taken in connection with the accompanying drawings it will be readily apparent that I have provided an efficient trial frame wherein the lens receiving cells can be quickly and readily adjusted for correctly positioning the testing lenses with respect to the horizontal alignment of the patient's eyes.

Attention is also called to the fact that the majority of the parts which make up my improved trial frame are formed of tubular triangular pieces which will add greater strength to the frame and provide for ready adjustment in view of the fact that the parts slide one within the other. The lens cells can also be readily adjusted toward and away from each other either individually or simultaneously and the nose bridge may be quickly and readily accommodated to the patient's face.

What I claim is:

1. A trial frame including a triangular shaped supporting arm, a pair of triangular shaped slides adjustable along said bar, means for simultaneously adjusting the same, supplemental substantially triangular shaped slides carried by each of the main slides thereof, and means for separately adjusting the latter slides.

2. A trial frame including a longitudinal bar, sleeves mounted thereon and arranged upon opposite sides of the center, a depending arm supported by one of said sleeves, a lens cell carried by the arm, a second depending arm shorter than the first carried by the second sleeve, a lens cell adjustably mounted on the arm, means for moving the lens cell longitudinally of the arm, and means for adjusting said sleeves longitudinally upon the bar either individually or simultaneously.

3. A trial frame including a longitudinal bar triangular in cross section similarly shaped sleeves mounted upon said bar and disposed upon opposite sides of the center thereof, an adjustable nose bridge supported upon the bar between said sleeves, arms extending outwardly from the sleeves, lens cells supported by the arms and means whereby to adjust one of said lens cells toward and away from the bar.

4. A trial frame including a longitudinal supporting bar sleeves mounted for sliding movement thereon, said sleeves being arranged upon opposite sides of the center of the bar, an adjustable nose bridge supported upon the bar between the sleeves, arms extending outwardly from the sleeves, lens cells carried by the arms, said cells being supported rearwardly and in spaced relation with respect to portions of said arms, connection whereby to adjust one of said cells toward and away from the bar and means whereby to adjust said sleeves either simultaneously or individually upon said bar.

5. A trial frame including a bar, sleeves mounted thereon and arranged upon opposite sides of the center, lens cells supported from said sleeves, a triangular shaped sleeve mounted upon and transversely of the bar between its ends, and a nose bridge mounted for adjustment with respect to the first mentioned sleeves.

6. A trial frame including a supporting bar triangular in crossed section, movable sleeves upon opposite sides of the center of said bar and shaped similar to said bar, arms extending outwardly from said sleeves, lens cells supported by said arms, means whereby to adjust one of said lens cells toward and away from the bar, and means whereby to either simultaneously or individually adjust the supporting arms toward and away from the nose bridge.

7. A trial frame including a supporting bar, lens carriers supported thereby, means for simultaneously correspondingly adjusting both of said lens carriers and additional means disposed below the bar for independently adjusting one of said lens carriers.

8. A trial frame including a supporting bar, a pair of slides adjustable longitudinally along said bar, means for moving said slides simultaneously along said bar longitudinally thereof, a second slide on each of the first slides adjustable longitudinally thereof, and means for moving each of the second slides independently of the other longitudinally along its corresponding first slide.

9. A trial frame including a longitudinal bar, movable sleeves mounted upon opposite sides of the center of said bar, a depending arm supported by one of said sleeves, a relatively short arm depending from the other sleeve and an arcuated member slidably associated with the relatively short arm.

BERNARD P. CURRIER.